United States Patent [19]

Pires

[11] Patent Number: 4,605,967

[45] Date of Patent: Aug. 12, 1986

[54] DIGITAL VIDEO SPECIAL EFFECTS GENERATOR

[76] Inventor: H. George Pires, 20 Surrey La., Parlin, N.J. 08859

[21] Appl. No.: 588,392

[22] Filed: Mar. 12, 1984

[51] Int. Cl.[4] .................................... H04N 5/262
[52] U.S. Cl. .................................. 358/183; 358/22; 358/181
[58] Field of Search ..................... 358/183, 22, 181

[56] References Cited

U.S. PATENT DOCUMENTS

| | | | |
|---|---|---|---|
| 3,757,041 | 9/1973 | Thorpe et al. | 358/183 |
| 4,199,790 | 4/1980 | Greenfield et al. | 358/183 X |
| 4,488,180 | 12/1984 | Rabinowitz | 358/22 X |

Primary Examiner—James J. Groody
Assistant Examiner—E. Anne Toth
Attorney, Agent, or Firm—Erwin S. Teltscher

[57] ABSTRACT

Keying signals controlling the switching from a first to a second available signal source are available at the output of a comparator. The input of the comparator receives the output of a presettable up/down counter. The comparator has a first reference input which receives a first reference count (generally one half of the maximum count) at which the counter is switched from up to down operation. The second reference input receives a clip reference count which is less than the first reference count. If the oscillator oscillates at a frequency which is a predetermined multiple of the line frequency, and if the counter is reset at the line frequency, the keying signal will cause a vertical bar containing the picture information from the second signal source to appear within the remaining display which corresponds to the first signal source. The position of the bar can be varied by changing the preset input of the main counter, while its width can be varied by changing the clip reference. Squares can be generated by combining keying signals derived from horizontally synchronized and vertically synchronized apparatus of the above described type in an AND circuit. Many other shapes can be generated by changing the preset inputs and/or the clip reference input of either or both the horizontally and vertically synchronized apparatus. Basic shapes other than bars can be created by use of other inputs to the comparator (e.g. ramps) in conjunction with other comparator settings.

7 Claims, 8 Drawing Figures

DIGITAL VIDEO SPECIAL EFFECTS GENERATOR

BACKGROUND OF THE INVENTION

Apparatus which generates special effects by switching selectively among a number of available video signal sources can be found in any television studio. In particular, these devices produce patterns defining the transition from a first to a second television signal by analog electronic means. Patterns which are generated by this type of equipment require a relatively large number of adjustments for set up and maintenance and the patterns often lack repeatability from one unit to the next or when recalled as signals from a computer.

SUMMARY OF THE INVENTION

It is an object of the present invention to describe equipment which results in pattern generation of much greater stability, requires a lesser number of adjustments both in setup and maintenance and furnishes exactly repeatable patterns under all conditions.

The present invention constitutes apparatus for selectively connecting a first or a second television signal source to a video system carrying out horizontal and vertical scans at horizontal and vertical scan rates, respectively. In the apparatus, digital counting signals are generated in a predetermined time relationship and at a predetermined multiple rate of either the horizontal or vertical scan rate. First or second keying signals are generated in response to predetermined ones of the counting signals. Finally, switch means are provided which connect the first or the second television signal source to the video system in response to the first or second keying signal, respectively.

The novel features which are considered as characteristic for the invention are set forth in particular in the appended claims. The invention itself, however, both as to its construction and its method of operation, together with additional objects and advantages thereof will best be understood from the following description of specific embodiments when read in connection with the accompanying drawing.

DESCRIPTION OF THE PREFERRED EMBODIMENTS

A large number of patterns may be generated using as the basis the generation of a ramp. A ramp can be generated readily by the apparatus shown in FIG. 1. Specifically, an oscillator 10 drives an eight bit counter 11. If oscillator 10 runs at a frequency which is 256 times the horizontal scanning frequency of the television signal, and if the counter is reset by the horizontal synchronization pulses, the instaneous value of the eight bit counting signal will be proportional to the time that has elapsed since the start of a line. The ramp signal is illustrated in FIG. 2(a).

Figure 2A:
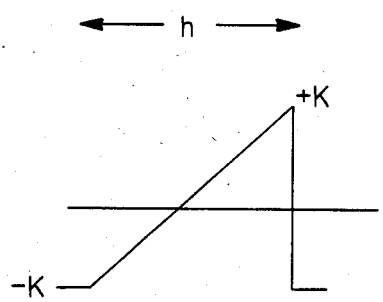
FIGS. 2a and 2b illustrate the waveforms at specified points in the embodiment of FIG. 1.
Figure 2B:
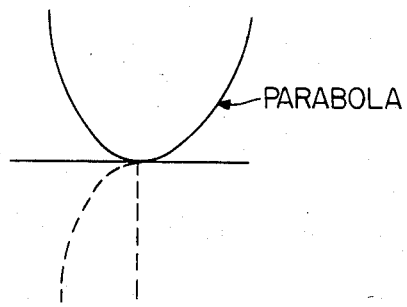
Figure 6:
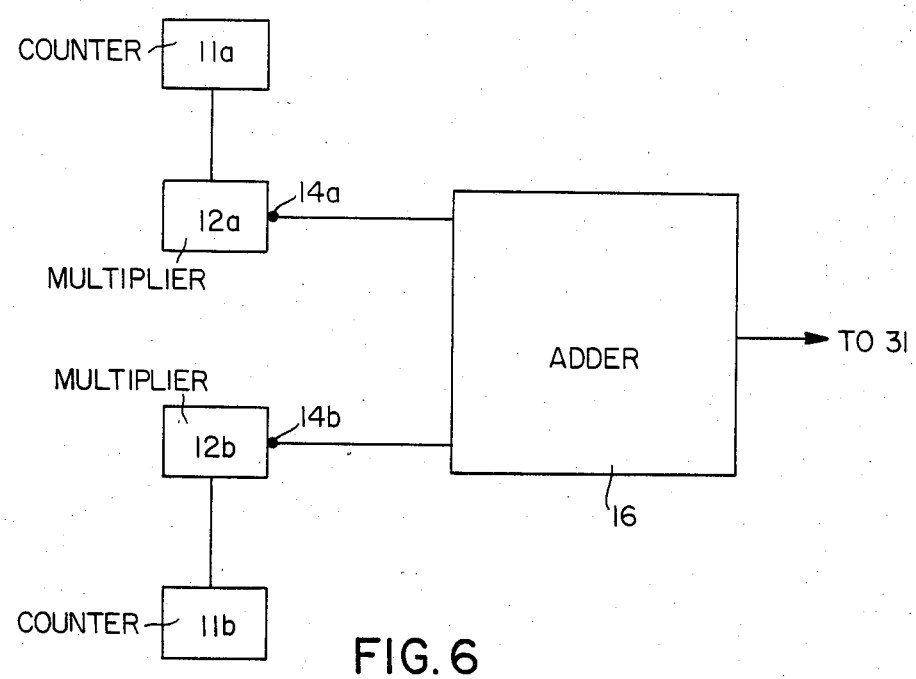
FIG. 6 is a block diagram of an adder circuit arranged to receive signals from two digital multipliers and producing an adder output signal.

To create a parabola, each of the eight bits at the output of counter 11 is applied to the inputs of an eight bit multiplier 12. Multiplier 12 has two eight bit inputs and a sixteen bit output, only the higher order eight bits of the output being used for purposes of the present invention. Each bit of the output of counter 11 is connected to the corresponding bit in each of the two sets of inputs to multiplier 12, that is the highest order output bit is connected to both highest order input bits, etc. The values of the eight higher order bits at the output of multiplier 12 (also called digital counting signals herein) will have values constituting a parabola as illustrated in FIG. 2(b). It will be understood that the multiplier 12 can be replaced by two multipliers 12a and 12b, and that the counter 11 can be replaced by two digital counting signal generators 11a and 11b, whose outputs are connected to respective inputs of multipliers 12a and 12b, as shown in FIG. 6. The digital counting signal generators 11a and 11b are preset in synchronism with horizontal and vertical synchronization pulses, such as, for example, television horizontal and vertical synchronization pulses. The multipliers 12a and 12b, in turn, have output terminals 14a and 14b, furnishing vertical and horizontal parabolic signals, respectively. The terminals 14a and 14b are connected to an adder 16, which adder adds those parabolic signals for application to the one input of the keying generator, e.g. the comparator 31.

Figure 3:
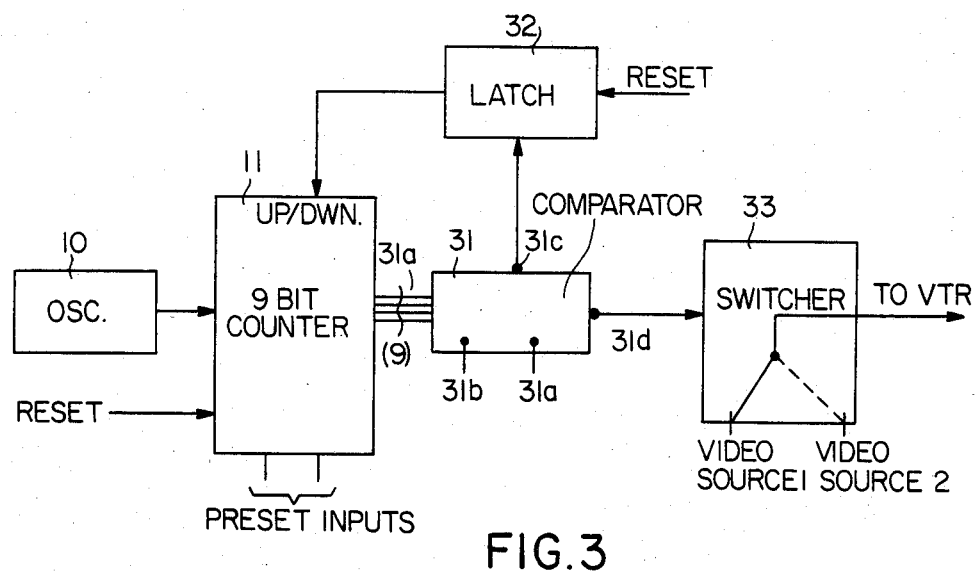
FIG. 3 is a block diagram of a triangle generator with shifting mechanism.

The use of the above described waveform generators to combine two television signals will now be described with reference to the remaining figures. Corresponding components in the different figures will be designated by the same reference numerals. In FIG. 3, an oscillator 10 supplies counting pulses to a presettable 9 bit counter 11. Counter 11 is an up/down counter which will count in the "down" phase in response to a control signal applied to the up/down input. The counting signals at the output of counter 11 are applied to one input of a comparator 31. Comparator 31 has a first reference input 31(a), a second reference input 31(b), a first output 31(c) and a second output 31(d).

The above described apparatus operates as follows: Let it be assumed first that counter 11 is preset to count A of FIG. 4. The counter will then start to count at a rate determined by the frequency of oscillator 10 toward its maximum count of 512. If now the first reference input, 31(a) of comparator 31 is set to a count of 256, output 31(c) of comparator 31 will be "high" when the count on counter 11 reaches 256. The "one" at output 31(c) will set latch 32, and counter 11 will proceed to count downwards until latch 32 is reset. A triangle having an apex B has thus been created. Finally, input 31(b) of comparator 31 is set to a clip level count less than 256, for example 220. This causes output 31(d) to be a "one" during the time that the count on counter 11 is between 220 and 256 during up counting and between 256 and 220 during the down counting phase. Thus if the output signal on output 31(d) is used as a keying signal to operate switcher 33, video signal source 1 will be selected for transmission or recording while output 31(d) is "high," while video source 2 will be so selected when output 31(d) is "0". If counter 11 and latch 32 are reset by the horizontal sychronization pulses, the output of video signal generator 1 will form a vertical bar having a width corresponding to the length of line C D situated in the center of a picture otherwise constituted by the signal from source 2. Changing the clip level, i.e. decreasing the reference count at terminal 31(b), will broaden the bar. A decrease of the clip level to the value of the preset input of counter 11 will cause the picture to consist solely of that from source 2, while an increase of the clip level to 256 will cause the complete picture displayed to be that coming from source 1.

Figure 4:
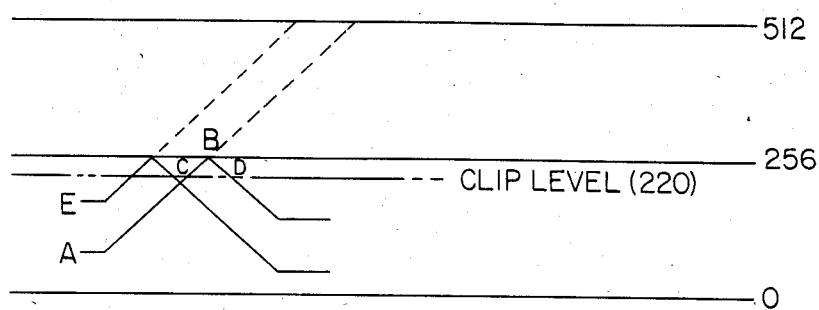
FIG. 4 illustrates waveforms associated with the triangle generator of FIG. 3.

Shifting of the bar in the horizontal direction can be accomplished by changing the preset value applied to counter 11. For example, if the counter is preset to a value E, the count on the counter will reach 256 earlier in the line interval than for the lesser preset value A. The resulting bar will thus have the same width, but its location will be shifted to the left. Shifts to the right can be accomplished by decreasing the preset value. (FIG. 4).

Figure 1:
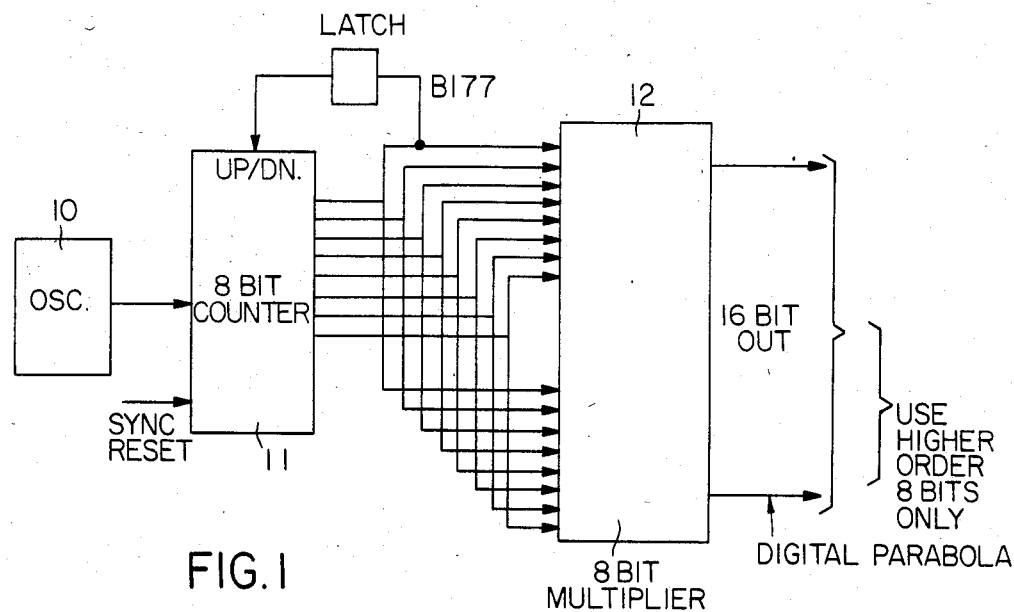
FIG. 1 is a schematic diagram of a first embodiment of the present invention.
Figure 5:
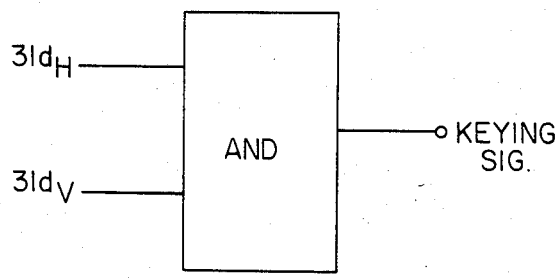
FIG. 5 is a block diagram of apparatus for generating a square.

It is obvious, that by adjusting the frequency of oscillator 10 to be a frequency which is 512 times the vertical scan frequency rather than the horizontal scan frequency as was assumed for FIG. 1, and if counter 11 and latch 32 were reset by the vertical rather than the horizontal synchronization signals, the keying signal at output 31(d) would cause the output from signal source to form a bar in the horizontal direction within a picture content otherwise controlled by signal source 1. If now, as is illustrated in FIG. 5, output 31(d) as controlled by horizontal synchronization signals is applied to one input of AND gate 51, while the other input of the AND gate receives the keying signal from a vertically control apparatus, then the keying signal at the output of the AND gate would cause a square to be formed at the center of the display. Both the location and the size of the square can be changed by suitable changes in the clip reference and in the predetermined values to which the two counters are preset.

It will be noted that the equipment is extremely versatile. For example, the present inputs and/or the clip reference inputs can be connected to the output of an analog/digital convertor whose input is operator controlled by the movement of a potentiometer. Alternatively, the preset and/or clip reference input can be controlled by the outputs of additional counters which can operate either in synchronism with the horizontal or vertical scans or even asynchronously.

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. Apparatus for selectively connecting a first or a second television signal source to a video system carrying out horizontal and vertical scans at horizontal and vertical scan rates, respectively, comprising in combination
    means for generating digital counting signals in a predetermined time relationship to a selected one of said scans and at a predetermined multiple of the associated one of said scan rates, and including first and second digital counting signal generating means respectively preset in synchronism with said horizontal and vertical scans,
    keying signal generator means connected to said counting signal generator means for generating a first or second keying signal in response to predetermined one of said counting signals, and including generator means for comparing said counting signals to a predetermined count, and generating said first or said second keying signal when said counting signals signify a count greater than, or less than said predetermined count, respectively,
    digital multiplier means having a first and second input connected to receive said counting signals, and including first and second multiplier means respectively having inputs connected to said first and second digital counting signal generating means, and first and second output terminals furnishing vertical and horizontal parabolic signals, respectively,
    switch means for connecting said first or second television signal source to said video system in response to said first or second keying signal, respectively, and
    adder means connected to said first and second multiplier means for adding said vertical to said horizontal parabolic signal, thereby creating an adder output signal for application to said keying signal generating means.

2. Apparatus as set forth in claim 1, wherein said digital counting signal generating means comprises an unidirectional counter reset in synchronism with a selected one of said scans.

3. Apparatus as set forth in claim 1, further comprising means for changing said predetermined count, thereby changing the time during said selected one of said scans at which said switch means switches from said first to said second television source.

4. Apparatus as set forth in claim 2, wherein said unidirectional counter is a presettable counter;
    further comprising means for presetting said presettable counter to a selectable starting count, thereby changing the time at which said switch means switches from said first to said second television signal source during said selected one of said scans.

5. Apparatus for selectively connecting a first or a second television signal source to a video system carrying out horizontal and vertical scans at horizontal and vertical scan rates, respectively, comprising in combination
    means for generating digital counting signals in a predetermined time relationship to a selected one of said scans and at a predetermined multiple of the associated one of said scan rates, and including up/down counting means adapted to change from up to down counting in response to a control signal, and means for generating said control signal when said digital counting signals signify a control count,
    wherein said scan rate is the vertical scan rate, so that information from said first television signal source forms a bar extending in a horizontal direction,
    keying signal generator means connected to said counting signal generator means for generating a first or second keying signal in response to predetermined one of said counting signals,
    said keying signal generator means generating said first or second keying signal when said counting output signals signify a count respectively above or below a predetermined slicing count less than said control count, and including first and second up/down counting means operating at a predetermined multiple of said horizontal and vertical scan rates, respectively, and switch means for connecting said first or second television signal source to said video system in response to said first or second keying signal, respectively, wherein said keying signal generating means include horizontal and vertical rate keying means connected to said first and second up/down counting means, respectively, for furnishing respective first and second keying signals when respective ones of said up/down counting means reach respective first and second slicing counts, and AND circuit means interconnected between said keying signal means and said switch means for generating final keying signals selecting said first television signal source only in response to first keying signals from both said horizontal and vertical rate keying means.

6. Apparatus as set forth in claim 5, wherein said up/down counting means counts up to a maximum count; and wherein said control count is one half said maximum count.

7. Apparatus as set forth in claim 5, wherein said selected one of said scans is the horizontal scan, whereby information from said first television source forms a bar extending in a vertical direction.

* * * * *